United States Patent
Holst et al.

(10) Patent No.: US 9,795,523 B2
(45) Date of Patent: Oct. 24, 2017

(54) WHEELCHAIR COMPRISING WHEEL AXLE AND HUB

(71) Applicant: PERMOBIL AB, Timrå (SE)

(72) Inventors: Göran Holst, Sundsvall (SE); Richard Rönngårdh, Sundsvall (SE)

(73) Assignee: PERMOBIL AB, Timra (SE)

( * ) Notice: Subject to any disclaimer, the term of this patent is extended or adjusted under 35 U.S.C. 154(b) by 0 days.

(21) Appl. No.: 15/202,248

(22) Filed: Jul. 5, 2016

(65) Prior Publication Data
US 2017/0007478 A1    Jan. 12, 2017

(30) Foreign Application Priority Data

Jul. 10, 2015  (CN) .................... 2015 2 0498386 U
Jul. 10, 2015  (EP) .................... 15176205

(51) Int. Cl.
| | | |
|---|---|---|
| A61G 5/04 | (2013.01) | |
| B60B 27/00 | (2006.01) | |
| B60B 27/06 | (2006.01) | |
| B60B 35/12 | (2006.01) | |

(52) U.S. Cl.
CPC ............. *A61G 5/041* (2013.01); *A61G 5/04* (2013.01); *A61G 5/042* (2013.01); *B60B 27/0021* (2013.01); *B60B 27/065* (2013.01); *B60B 35/122* (2013.01); *B60B 2200/26* (2013.01); *B60B 2900/321* (2013.01)

(58) Field of Classification Search
CPC .......... A61G 5/10; A61G 5/023; A61G 11/18; A61G 5/00; A61G 5/025; A61G 5/041
See application file for complete search history.

(56) References Cited

U.S. PATENT DOCUMENTS

| | | | | | |
|---|---|---|---|---|---|
| 2,957,706 | A | * | 10/1960 | Hanley ................. | B60G 11/18 188/18 R |
| 3,584,669 | A | * | 6/1971 | Cooley ................. | B60B 37/04 152/52 |
| 4,274,650 | A | * | 6/1981 | Gilles .................... | A61G 5/023 280/249 |
| 4,354,691 | A | * | 10/1982 | Saunders ............... | A61G 5/025 280/244 |
| 4,422,660 | A | * | 12/1983 | Costello ................ | A61G 5/10 280/250.1 |
| 4,503,724 | A | * | 3/1985 | Ward .................... | A61G 5/023 180/206.6 |
| 5,143,391 | A | * | 9/1992 | Robertson ............. | A61G 5/00 280/250.1 |
| 5,301,971 | A | * | 4/1994 | Brereton ............... | A61G 5/10 280/242.1 |

(Continued)

*Primary Examiner* — Hau V Phan
(74) *Attorney, Agent, or Firm* — McAndrews, Held & Malloy, Ltd.

(57) ABSTRACT

The present disclosure relates to a wheelchair comprising a wheel axle (1) having a wheel axle end portion (9) and hub (3) having a central through-opening (11) arranged to receive the wheel axle end portion (9). The wheel axle end portion (9) has an external surface having three chamfered faces (3a, 3b), each chamfered face (3a, 3b) defining a planar surface, and the hub (3) has inner walls (13a, 13b, 13c) defining the central through-opening (11). The inner walls (13a, 13b, 13c) are arranged to engage with the chamfered faces (3a, 3b) of the wheel axle end portion (9) to prevent relative rotation between the hub (3) and the wheel axle (1).

15 Claims, 2 Drawing Sheets

(56) References Cited

U.S. PATENT DOCUMENTS

| | | | | |
|---|---|---|---|---|
| 6,018,869 A | * | 2/2000 | Slankard | B60B 27/023 29/894.361 |
| 6,059,378 A | * | 5/2000 | Dougherty | B21K 25/00 301/124.1 |
| 2004/0023760 A1 | * | 2/2004 | Cockrill, Jr. | A63B 23/0405 482/93 |

* cited by examiner

SECTION A-A

WHEELCHAIR COMPRISING WHEEL AXLE AND HUB

CROSS-REFERENCE TO RELATED APPLICATIONS/INCORPORATION BY REFERENCE

The present application claims priority to Chinese Patent Application No. 201520498386.3, filed Jul. 10, 2015, and European Patent Application No. 15176205.1, filed Jul. 10, 2015. The contents of each of the above-identified applications are hereby incorporated herein by reference in their entirety.

TECHNICAL FIELD

The present disclosure generally relates to wheelchairs. In particular it relates to a wheelchair having a wheel axle and a hub to which a rim of a wheel is mounted.

BACKGROUND

Wheelchairs typically have wheel axles, and hubs for mounting wheels thereto. Each hub may be mounted to a respective wheel axle end portion of a wheel axle. In particular, each hub may be arranged to receive a wheel axle end portion of a wheel axle. Each hub may therefore have a hub opening which is arranged to accommodate a wheel axle end portion.

In order to prevent relative rotation between the hub and the wheel axle, the wheel axle end portion may be provided with an axially protruding portion and the inner surface of the hub opening may be provided with a corresponding axial groove for receiving the axial protruding portion. To be able to mechanically withstand torque-related stress between the wheel axle and the hub during the operational lifetime of the wheelchair, there should be no more than a very small rotational play between the axial protruding portion and the axial groove. Mechanical strength withstand is especially of concern when the wheel axle is short, which is common in order to fulfil a desire for less wide wheelchairs. However, the play cannot be as small as would be desired, because that would render mounting of the hub to the wheel axle end portion difficult and would require that larger axial forces would have to be applied when fitting the hub around the wheel axle end portion. The application of large axial forces during assembly could cause damage to the wheelchair, especially in the case of a motorised wheelchair for which the wheel axle may be mechanically coupled to the gearbox of the wheelchair. Excessive axial forces during assembly could in particular cause damage to components inside the gearbox. The tolerances must thus be rather tight when constructing the hub and the wheel axle, which places high requirements on the manufacturing process.

A further aspect is that the small rotational play between the axial protrusion of the wheel axle end portion and the axial groove of the hub could affect the bolt with which the hub is fastened to the wheel axle. On one side of the wheelchair, i.e. at one specific wheel, the bolt could loosen, and on the opposite side wheel, the bolt could tighten. This may result in that the wheel could loosen, or even fall off completely.

Measures for preventing the loosening of the wheels may for example include higher quality bolts, locking washers, and bonding of the bolts with thread locks. It would however be desirable to simplify the hub and wheel axle design of a wheelchair and to further mitigate problems with previous solutions.

SUMMARY

In view of the above, a general object of the present disclosure is to provide a wheelchair which solves or at least mitigates the problems of the prior art.

Hence, according to a first aspect of the present disclosure there is provided a wheelchair comprising a wheel axle having a wheel axle end portion, and a hub having a central through-opening arranged to receive the wheel axle end portion, wherein the wheel axle end portion has an external surface having three chamfered faces, and wherein the hub has inner walls defining the central through-opening, which inner walls are arranged to engage with the chamfered faces of the wheel axle end portion to prevent relative rotation between the hub and the wheel axle.

An effect which may be obtainable thereby is that a high mechanical strength may be provided even for short wheel axles in a simpler manner than in previous solutions. High mechanical strength may especially be advantageous for motorised wheelchairs in particular if the wheel axle is a drive wheel axle, i.e. arranged to be driven by a motor of the wheelchair. This effect is obtained because tangential, i.e. rotational, play as well as axial play may be eliminated thus providing lower requirements on tolerances because engagement of the hub and the wheel axle end portion is only dependent on the extent that the wheel axle end portion is received by the hub. Hence, by pushing the wheel axle end portion deep enough into the through-opening of the hub, a tight fit between these two components may be obtained without any play. As a result, the risk of damage during assembly may be reduced. The tight fit also mitigates the risk of loosening of the wheel.

Generally, the present design is more robust than the described prior art solution and simpler to assemble with lower risk of damaging the wheel arrangement or the drivetrain in the event of a motorised wheelchair.

According to one embodiment the wheel axle end portion has an axial central opening, and wherein the wheelchair comprises a bolt extending through the through-opening of the hub and into the axial central opening to fasten the hub to the wheel axle.

According to one embodiment the chamfered faces are evenly distributed along the circumferential direction of the wheel axle end portion.

According to one embodiment the through-opening of the hub is tapering to be able to receive the wheel axle end portion.

According to one embodiment each chamfered face defines a planar surface.

According to one embodiment the chamfered faces form part of respective sides of a truncated triangular pyramid.

According to one embodiment in a cross-section of the wheel axle end portion each pair of adjacent chamfered face is arranged at an angle of 60 degree.

According to one embodiment the external surface of the wheel axle end portion has exactly three chamfered faces. Advantageously, exactly three chamfered faces provide an especially robust engagement between the wheel axle end portion and the central through-opening of the hub. Moreover, the exactly three chamfered face design provides a simple manufacturing of the wheel axle end portion.

According to one embodiment the external surface of the wheel axle end portion has more than three chamfered faces.

According to one embodiment the inner walls of the hub have inclined surfaces, defining a respective plane that intersects the central axis of the hub, wherein each inclined surface is arranged to bear against a respective chamfered face of the wheel axle end portion.

According to one embodiment each inclined surface has a longer axial extension than the axial extension of any of the chamfered faces. This ensures that the wheel axle end portion does not protrude from the through-opening at the distal end thereof. Moreover, it is thereby possible to push the wheel axle end portion into the through-opening of the hub until the chamfered faces are fully received by the hub and the wheel axle end portion is wedged inside the hub to thereby obtain a tight fit and thus prevent relative axial and rotational movement between the hub and the wheel axle.

According to one embodiment the wheelchair is a motorised wheelchair.

According to one embodiment the wheelchair is an electrically powered wheelchair.

One embodiment comprises a gearbox, wherein the wheel axle is mechanically coupled to the gearbox for driving the wheel axle.

One embodiment comprises a rim and a wheel, wherein the rim is mounted to the hub and to the wheel.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which:

FIG. 2b is a front view of the wheel axle and hub assembly in FIG. 2a;

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

This disclosure relates to a wheelchair which has a wheel axle having a wheel axle end portion and a hub which is mountable to the wheel axle end portion. A rim is mountable to the hub to thereby attach a wheel to the hub.

The wheelchair has several wheel axles of the type presented herein. The number of such wheel axles depend on the number of wheels. If the wheelchair is a manual wheelchair, i.e. a motorless wheelchair, the number of wheel axles may for example be equivalent to the number of wheels divided by two. In the event that the wheelchair is a motorised wheelchair the wheel axles may be drive wheel axles arranged to be driven by a motor, and the number of wheel axles may thus be dependent of the number of drive wheels. In this case, the wheel axles may be drive wheel axles which may be equivalent in number to the number of drive wheels.

The wheel axle has a wheel axle end portion which has an external surface having three chamfered faces. The wheel axle end portion with the chamfered faces does not have a circular cross-section. The chamfered faces could be exactly three in number or there could be more than three chamfered faces. The chamfered faces are thus inclined relative to the central axis of the wheel axle and the wheel axle end portion tapers towards the end face thereof. Each chamfered face defines a respective plane. Each such plane has the same inclination relative to the central axis of the wheel axle. The hub has a central, axially extending, through-opening having inner walls. The hub is arranged to receive the wheel axle end portion in the through-opening, and the inner walls are arranged to engage with the wheel axle end portion, especially with the chamfered faces, to thereby prevent rotation of the wheel axle relative to the hub.

Figure 1:
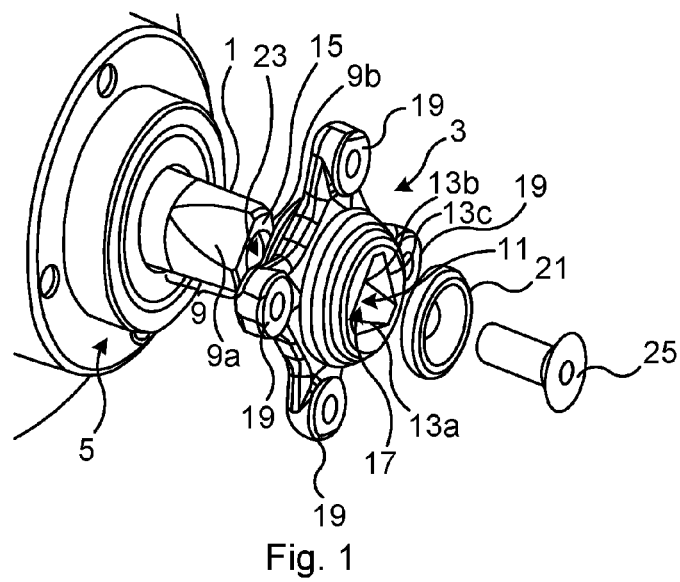
FIG. 1 is a perspective view of an example of an arrangement comprising a wheel axle and a hub.

FIG. 1 shows an example of a wheel axle 1 and a hub 3 of a motorised wheelchair (not shown). The motorised wheelchair may have a drivetrain for driving the wheels of the wheelchair. The drivetrain may include a motor and a gearbox mechanically coupled to the motor to drive the wheel axle 1.

Figure 2A:
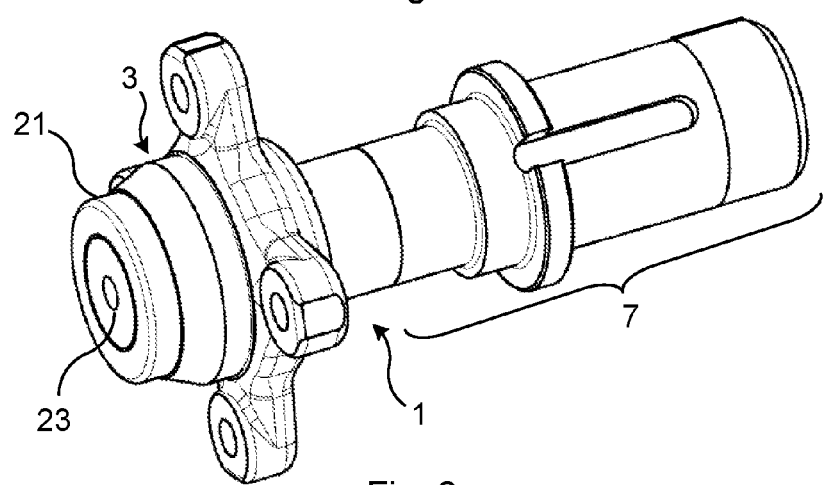
FIG. 2a is a perspective view of the wheel axle and hub, forming a wheel axle and hub assembly, of FIG. 1.

The exemplified wheel axle 1 has a gear box end portion 7, as shown in FIG. 2a, arranged to be mechanically coupled to the gearbox 5. In FIG. 1, the gear box end portion 7 is mechanically coupled to the gearbox 5 and can thus not be seen. The gear box end portion 7 generally has a circular cross-section, to enable rotation of the wheel axle 1, except where the gear box end portion 7 has means for engaging with the gearbox 5 to thereby be driven by the motor.

The exemplified wheel axle 1 also has a wheel axle end portion 9. The wheel axle end portion 9 has an external surface having three chamfered faces 9a, 9b, two of which can be seen in FIG. 1. As previously noted, the number of chamfered faces may be exactly three as in the present example, or the wheel axle end portion may have more than three chamfered faces, for example four chamfered faces or five chamfered faces. All of the chamfered faces 9a, 9b are planar. The corresponding dimensions of each of the chamfered faces 9a, 9b are preferably identical. To this end each chamfered face 9a, 9b has the same length in the axial direction, and preferably also the same width. The chamfered faces 9a, 9b are inclined and the wheel axle end portion 9 thus tapers towards its end face 15. Each chamfered face 9a, 9b extends to the radial plane defined by the end face 15. Each chamfered face 9a, 9b is hence terminated by the radial plane defined by the end face 15. All of the chamfered faces 9a, 9b have the same inclination relative to the central axis of the wheel axle 1. The inclination angle of each chamfered face relative to a plane containing the entire central axis of the wheel axle 1 may typically be in the range 5-80 degrees, preferably in the range 7-50 degrees, even more preferably in the range 8-45 degrees. The angle is generally chosen in relation to the length and the diameter of the wheel axle. A shallower wheel axle will often imply a greater angle.

The hub 3 is arranged to be mounted on the wheel axle end portion 9. The hub 3 has a central through-opening 11 extending along the axial direction of the hub 3. The through-opening 11 has inner walls 13a-13c which define the cross-sectional shape of the through-opening 11. The hub 3 is arranged to receive the wheel axle end portion 9 the in through-opening 11. Furthermore, the inner surfaces 13a-13c are arranged to bear against or abut the wheel axle end portion 9 when the hub 3 is arranged around the wheel axle end portion 9. To this end, the hub 3 is arranged to engage with the wheel axle end portion 9, thereby preventing relative movement between the wheel axle 1 and the hub 3.

The through-opening 11 of the hub 3 is tapering in a direction away from the wheel axle 1. The proximal mouth of the through-opening 11, where the proximal mouth is the mouth of the through-opening which receives the wheel axle 1, thus has a larger cross-sectional area than the cross-sectional area of the distal mouth 17 of the through-opening 11.

The wheel axle 1 may have an axial central opening 23. The axial central opening 23 extends from an end face 15 of the wheel axle end portion 9 into the wheel axle 1. The arrangement shown in FIG. 1 comprises a washer 21 and a bolt 25. The bolt may for example be an M8 bolt or an Mb10 bolt. The bolt 25 is arranged in and extends through the through-opening 11 of the hub 3 and into the axial central opening 23 of the wheel axle 1. The hub 3 is thereby fastened and fixated to the wheel axle 1. The washer 21 is arranged between the bolt head and the hub 3. The diameter of the axial central opening 23 will affect the choices of the inclination angles of the chamfered faces 9a, 9b.

The hub 3 furthermore comprises a plurality of arms 19 arranged to be fastened to a rim. According to the example, the hub 3 has four arms, but alternatively the hub could be provided with exactly three arms, as shown in FIG. 2c, or more than four arms for fastening a rim. Each arm may be provided with a respective fastening arrangement, for example a respective opening arranged to receive a bolt, to thereby fasten the hub 3 to the rim of a wheel. Alternatively, the hub could be integrated with the rim, and potentially also with the wheel.

The chamfered faces 9a, 9b are according to the example evenly distributed along the circumferential direction of the wheel axle 1. The chamfered faces 9a, 9b are hence distributed in a symmetric manner. The chamfered faces could however alternatively be distributed unevenly along the circumferential direction, i.e. unsymmetrically. Any adjacent pair of chamfered faces 9a, 9b may for example be arranged at an angle of 60 degrees. It should however be noted that according to the present example, there is a curved portion of the external surface of the wheel axle end portion 9 between any adjacent chamfered faces 9a, 9b, connecting adjacent chamfered faces 9a, 9b.

According to the example in FIG. 1 the chamfered faces may be seen to form part of the sides of a truncated triangular pyramid.

Figure 2B:
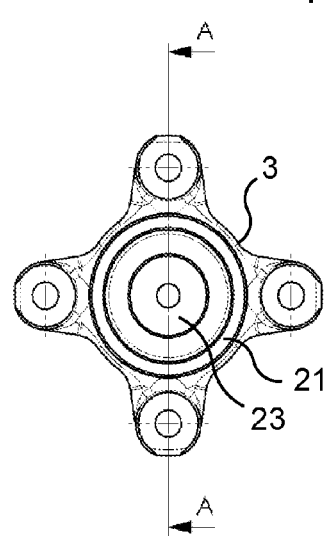
Figure 2C:
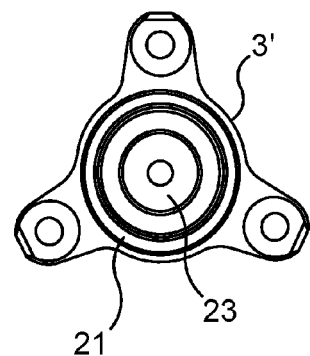
FIG. 2c shows a front view of a variation of the wheel axle and hub assembly, in which the hub has three arms.

FIG. 2a shows a perspective view of the wheel axle 1 and the hub 3 in an assembled state, while FIG. 2b shows the arrangement in FIG. 2a in a front view only with the hub 3, the washer 21 and the bolt 25 being visible.

FIG. 2c shows a front view of a wheel axle and a hub identical to the one presented in FIGS. 1 and 2a, except that the hub 3' in FIG. 2c has exactly three arms.

Figure 3:
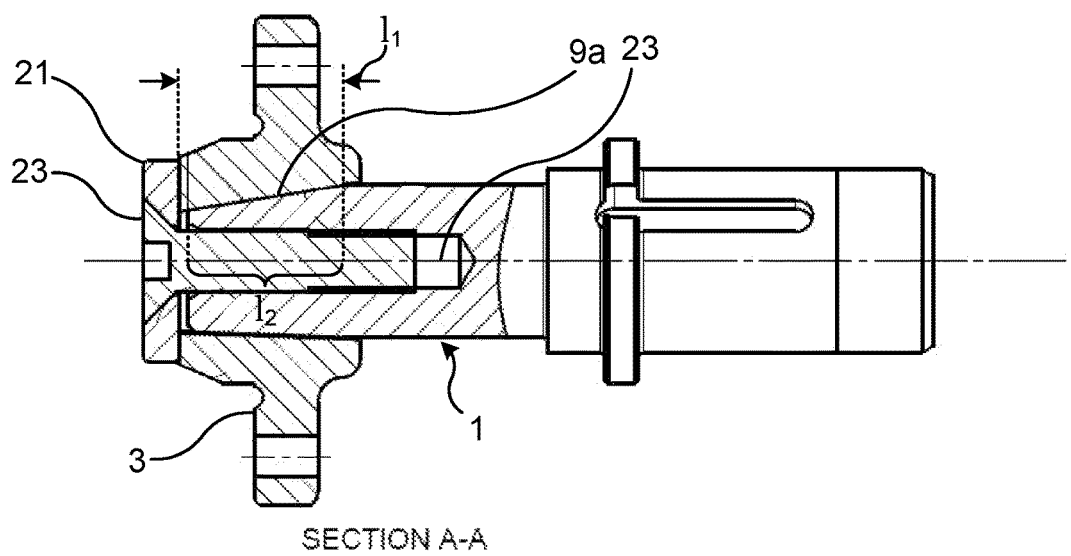
FIG. 3 is a section along A-A in FIG. 2b of the wheel axle and hub assembly.

FIG. 3 shows the section A-A in FIG. 2a of the wheel axle 1 and the hub 3. One of the chamfered faces, here exemplified by chamfered surface 9a, can be seen from the side inside the through-opening 11. The inner surfaces 13a-13c of the through-opening 11 have inclined surfaces identical to the corresponding chamfered faces 9a, 9b of the wheel axle end portion 9. In this manner, the through-opening 11 is tapering, as has been previously mentioned. Each chamfered face 9a, 9b abuts or bears against the corresponding inclined surface of the inner walls to prevent relative rotation between the wheel axle 1 and the hub 3. Prior to assembly of the hub 3 with the wheel axle 1, the axial length or axial extension 11 of each inclined surface of the inner walls 13a-13c is according to the example in FIG. 3 longer than the axial length or axial extension 12 of any chamfered face 9a, 9b. This means that the smallest cross-sectional area in the through-opening 11 will be smaller than the smallest cross-sectional area of the wheel axle end portion provided with the chamfered faces 3a, 3b. As a result, the wheel axle end portion 9 cannot be received in the hub 3 in a manner in which the wheel axle end portion 9 would protrude from the distal mouth 17 of the through-opening 11. This ensures that a tight assembly can be obtained with the washer 21 and the bolt 25.

According to the example in FIG. 3 each inclined surface of the inner walls extends to the distal end of the through-opening 11, i.e. to the distal mouth 17 of the through-opening 11.

Figure 4:
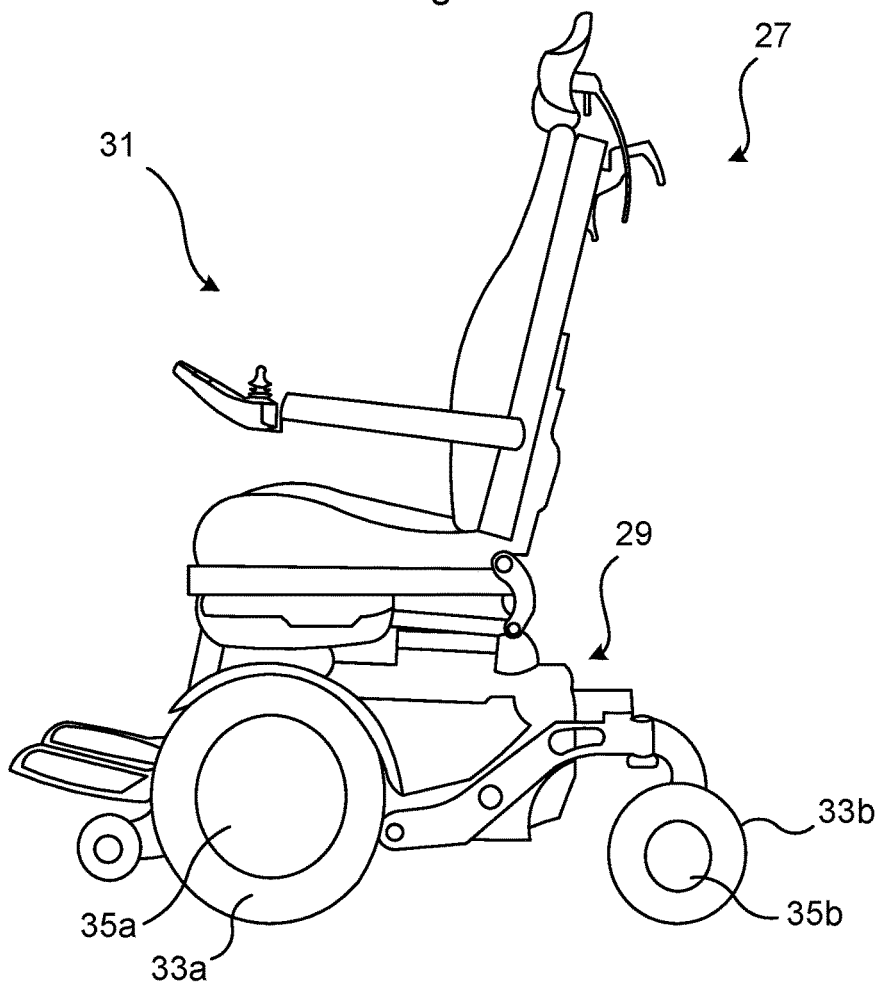
FIG. 4 is a wheelchair comprising a wheel axle and hub assembly.

FIG. 4 depicts an example of a wheelchair 27. In the example in FIG. 4, the wheelchair is a motorised wheelchair, typically an electrically powered wheelchair, although, as previously mentioned the wheelchair could however also be a manual wheelchair. The exemplified wheelchair 27 is of frontwheel drive type, but it should be noted that the wheelchair alternatively could be of for example midwheel drive type, back wheel drive type, four wheel drive type or six wheel drive type.

The wheelchair 27 comprises a chassis arrangement 29, wheels 33a, 33b, rims 35a, 35b and a seat assembly 31 mounted to the chassis arrangement 29. The wheelchair 27 also comprises hubs 3 and wheel axles 1 (not shown) as has been described herein, to which the wheels 33a are mounted via the rims 35a.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A wheelchair comprising:
  a wheel axle having a wheel axle end portion, and
  a hub having a central through-opening arranged to receive the wheel axle end portion,
  wherein the wheel axle end portion has an external surface having three chamfered faces, each chamfered face defining a planar surface, and wherein the hub has inner walls defining the central through-opening, which inner walls are arranged to engage with the chamfered faces of the wheel axle end portion to prevent relative rotation between the hub and the wheel axle.

2. The wheelchair of claim 1, wherein the wheel axle end portion has an axial central opening, and wherein the wheelchair comprises a bolt extending through the through-opening of the hub and into the axial central opening to fasten the hub to the wheel axle.

3. The wheelchair of claim 1, wherein the chamfered faces are evenly distributed along the circumferential direction of the wheel axle end portion.

4. The wheelchair of claim 1, wherein the through-opening of the hub is tapering to be able to receive the wheel axle end portion.

5. The wheelchair of claim 1, wherein the chamfered faces form part of respective sides of a truncated triangular pyramid.

6. The wheelchair of claim 1, wherein in a cross-section of the wheel axle end portion each pair of adjacent chamfered face is arranged at an angle of 60 degree.

7. The wheelchair of claim 1, wherein the external surface of the wheel axle end portion has exactly three chamfered faces.

8. The wheelchair of claim 1, wherein the external surface of the wheel axle end portion has more than three chamfered faces.

9. The wheelchair of claim 1, wherein the inner walls of the hub have inclined surfaces, defining a respective plane that intersects the central axis of the hub, wherein each inclined surface is arranged to bear against a respective chamfered face of the wheel axle end portion.

10. The wheelchair of claim 9, wherein each inclined surface has a longer axial extension than the axial extension of any of the chamfered faces.

11. The wheelchair of claim 1, comprising a rim and a wheel, wherein the rim is mounted to the hub and to the wheel.

12. The wheelchair of claim 1, wherein the wheelchair is a motorised wheelchair.

13. The wheelchair of claim 12, wherein the wheelchair is an electrically powered wheelchair.

14. The wheelchair of claim 12, comprising a gearbox, wherein the wheel axle is mechanically coupled to the gearbox for driving the wheel axle.

15. The wheelchair of claim 1, wherein the wheel axle end portion is at a distal end of the wheel axle.

\* \* \* \* \*